US010728571B2

(12) United States Patent
Son et al.

(10) Patent No.: US 10,728,571 B2
(45) Date of Patent: Jul. 28, 2020

(54) INTER PREDICTION METHOD AND DEVICE IN VIDEO CODING SYSTEM

(71) Applicant: LG Electronics Inc., Seoul (KR)

(72) Inventors: Eunyong Son, Seoul (KR); Moonmo Koo, Seoul (KR); Hyeongmoon Jang, Seoul (KR); Seungwook Park, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 15/750,093

(22) PCT Filed: Jul. 15, 2016

(86) PCT No.: PCT/KR2016/007733
§ 371 (c)(1),
(2) Date: Feb. 2, 2018

(87) PCT Pub. No.: WO2017/022973
PCT Pub. Date: Feb. 9, 2017

(65) Prior Publication Data
US 2018/0220149 A1 Aug. 2, 2018

Related U.S. Application Data

(60) Provisional application No. 62/200,643, filed on Aug. 4, 2015.

(51) Int. Cl.
H04N 19/513 (2014.01)
H04N 19/176 (2014.01)
(Continued)

(52) U.S. Cl.
CPC ......... H04N 19/513 (2014.11); H04N 19/105 (2014.11); H04N 19/159 (2014.11);
(Continued)

(58) Field of Classification Search
CPC .. H04N 19/513; H04N 19/182; H04N 19/503; H04N 19/517; H04N 19/105; H04N 19/44; H04N 19/159; H04N 19/176
See application file for complete search history.

(56) References Cited

U.S. PATENT DOCUMENTS

2017/0188041 A1* 6/2017 Li .................. H04N 19/182
2018/0234697 A1* 8/2018 Jang ................ H04N 19/182
(Continued)

FOREIGN PATENT DOCUMENTS

CN 104539966 A * 4/2015 ........... H04N 19/513
JP 09121353 5/1997
(Continued)

OTHER PUBLICATIONS

Huang et al. "Control-Point Representation and Differential Coding Affine-Motion Compensation", IEEE Transactions on Circuits and Systems for Video Technology, vol. 23, No. 10, Oct. 2013 (Year: 2013).*
(Continued)

Primary Examiner — Richard A. Hansell, Jr.
(74) Attorney, Agent, or Firm — Fish & Richardson P.C.

(57) ABSTRACT

A video decoding method performed by a decoding device includes: deriving control points (CPs) for a current block; acquiring motion vectors for the CPs; deriving a sample-unit motion vector in the current block based on the acquired motion vectors; deriving a prediction sample for the current block based on the sample-unit motion vector; and generating a restoration sample based on the prediction sample, wherein coordinates of a bottom-right sample position of the current block are (0, 0), and coordinates of CP0 among the CPs are (0, 0). Inter prediction is effectively performed through sample-unit motion vectors even when an image in a current block is planarly moved and variously changed, and since motion vectors for CPs are derived based on (Continued)

already-decoded neighboring blocks, an amount of information for the motion vectors for the CPs and for a residual signal for the current block is reduced, improving overall coding efficiency.

12 Claims, 9 Drawing Sheets

(51) Int. Cl.
  *H04N 19/105* (2014.01)
  *H04N 19/517* (2014.01)
  *H04N 19/503* (2014.01)
  *H04N 19/182* (2014.01)
  *H04N 19/159* (2014.01)
  *H04N 19/44* (2014.01)

(52) U.S. Cl.
  CPC ......... *H04N 19/176* (2014.11); *H04N 19/182* (2014.11); *H04N 19/44* (2014.11); *H04N 19/503* (2014.11); *H04N 19/517* (2014.11)

(56) References Cited

U.S. PATENT DOCUMENTS

2019/0082191 A1* 3/2019 Chuang ................ H04N 19/513
2019/0116376 A1* 4/2019 Chen ................... H04N 19/176
2019/0149838 A1* 5/2019 Zhang .................. H04N 19/54
                                                                 375/240.16
2019/0297325 A1* 9/2019 Lim ...................... H04N 19/44

FOREIGN PATENT DOCUMENTS

| JP | 09172644 | 6/1997 |
|---|---|---|
| KR | 10-2009-0083290 | 8/2009 |
| KR | 10-2014-0113855 | 9/2014 |
| WO | WO11128365 | 10/2011 |
| WO | 2015099816 | 7/2015 |

OTHER PUBLICATIONS

Extended European Search Report in European Appln. No. 16833209.6, dated Feb. 18, 2019, 12 pages.

Chen et al., "Algorithm Description of Joint Exploration Test Model 2," JVET-B1001_v3, Joint Video Exploration Team (JVET) of ITU-T SG 16 WP 3 and ISO/IEC JTC 1/SC 29WG 11, 2nd Meeting: San Diego, USA, Feb. 20-26, 2016, 33 pages.

Huang et al., "Control-Point Representation and Differential Coding Affine-Motion Compensation," IEEE Transactions Circuits and Systems for Video Technology, Oct. 2013, 23(10): 1651-1660.

* cited by examiner

INTER PREDICTION METHOD AND DEVICE IN VIDEO CODING SYSTEM

CROSS-REFERENCE TO RELATED APPLICATIONS

This application is a National Stage application under 35 U.S.C. § 371 of International Application No. PCT/KR2016/007733, filed Jul. 15, 2016, which claims the benefit of U.S. Application No. 62/200,643, filed on Aug. 4, 2015. The disclosures of the prior applications are incorporated by reference in their entirety.

TECHNICAL FIELD

The present invention relates to a video coding technique, and more particularly, to an intra prediction method and device in a video coding system.

BACKGROUND

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present invention provides a method and a device for enhancing image coding efficiency.

Another technical purpose of the present invention is to provide an affine motion model based inter prediction method and device.

Another technical purpose of the present invention is to provide a method and device for performing sample unit motion vector based inter prediction.

Another technical purpose of the present invention is to provide a method and device for deriving a sample unit motion vector based on a motion vector of control points for the current block.

Another technical purpose of the present invention is to provide a method and device for deriving a motion vector for a control point for a current block based on a neighboring block.

Another technical purpose of the present invention is to provide a method and device for deriving a motion vector for a control point based on a sample of a neighboring block.

In accordance with one embodiment of the present invention, there is provided a video decoding method performed by a decoding device. The method includes deriving control points (CPs) for the current block; obtaining motion vectors for the CPs; deriving a motion vector on a sample basis in the current block based on the obtained motion vectors; deriving a predicted sample for the current block based on the sample-based motion vector; and generating a reconstructed sample based on the predicted sample, wherein a coordinate of a bottom-right sample in the current block is (0, 0), wherein a coordinate of a CP0 among the CPs is (0, 0).

In accordance with another embodiment of the present invention, there is provided a decoding device to perform video decoding. The device includes a decoding module configured for obtaining prediction mode information for a current block from bitstream; a prediction module configured for deriving control points (CPs) for the current block, for obtaining motion vectors for the CPs, for deriving a motion vector on a sample basis in the current block based on the obtained motion vectors, and for deriving a predicted sample for the current block based on the sample-based motion vector, wherein a coordinate of a bottom-right sample in the current block is (0, 0), wherein a coordinate of a CP0 among the CPs is (0, 0); and a adder configured for generating a reconstructed sample based on the predicted sample.

In accordance with still another embodiment of the present invention, there is provided a video encoding method performed by an encoding device. The method includes deriving control points (CPs) for the current block; obtaining motion vectors for the CPs; deriving a motion vector on a sample basis in the current block based on the obtained motion vectors; generating a predicted sample for the current block based on the sample-based motion vector; and encoding and outputting prediction mode information for the current block, wherein a coordinate of a bottom-right sample in the current block is (0, 0), wherein a coordinate of a CP0 among the CPs is (0, 0).

In accordance with still another embodiment of the present invention, there is provided an encoding device to perform video encoding. The device includes a prediction module configured for deriving control points (CPs) for the current block, for obtaining motion vectors for the CPs, for deriving a motion vector on a sample basis in the current block based on the obtained motion vectors, and for generating a predicted sample for the current block based on the sample-based motion vector, wherein a coordinate of a bottom-right sample in the current block is (0, 0), wherein a coordinate of a CP0 among the CPs is (0, 0); and an encoding module configured for encoding and outputting prediction mode information for the current block.

According to the present invention, more accurate sample-based motion vectors for the current block may be derived and thus the inter prediction efficiency may be significantly increased.

According to the present invention, motion vectors for samples in the current block may be efficiently derived based on the motion vectors of the control points for the current block.

According to the present invention, motion vectors for samples in the current block may be derived based on the motion vectors of available neighboring blocks, without additional information about the motion vectors of the control points for the current block. This can eliminate or reduce the amount of data for the motion vectors of the control points and thus improve overall coding efficiency.

According to the present invention, not only when the image in the current block is translated, but also when the image is rotated, zoomed in, zoomed out, or parallelogram-deformed, inter-prediction may be effectively performed using sample-based motion vectors. In this way, the amount of data for the residual signal for the current block can be eliminated or reduced, and, thus, the overall coding efficiency can be improved.

According to the present invention, motion vectors of control points may be derived based on already decoded neighboring blocks. This can significantly reduce the amount of information on the motion vectors of the control points and thus improve the overall coding efficiency.

DETAILED DESCRIPTION

Figure 1:
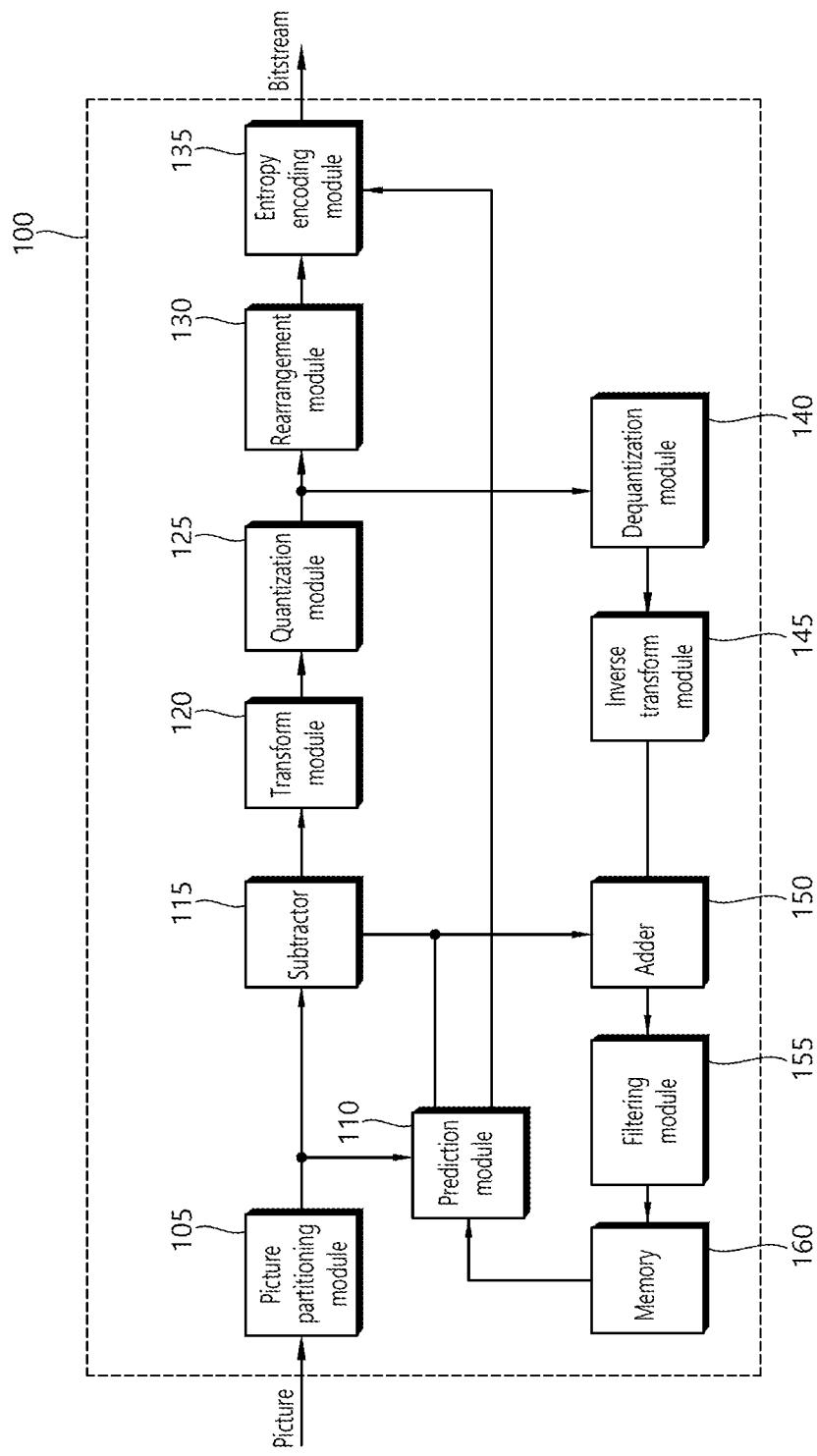
FIG. 1 is a block diagram schematically illustrating a video encoding device according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioning module 105, a prediction module 110, a transform module 120, a quantization module 125, a rearrangement module 130, an entropy encoding module 135, a dequantization module 140, an inverse transform module 145, a filtering module 155, and memory 160.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU. The CTU may correspond to a coding tree block CTB, the CU may correspond to a coding block CB, the PU may correspond to a prediction block PB and the TU may correspond to a transform block TB.

The prediction module 110 includes an inter prediction unit that performs an inter prediction process and an intra prediction unit that performs an intra prediction process, as will be described later. The prediction module 110 performs a prediction process on the processing units of a picture divided by the picture partitioning module 105 to create a prediction block including a predicted sample or a predicted sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels, pels, and samples may be used interchangeably herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 120. The prediction mode information, the motion vector information, and the like used for the prediction are encoded along with the residual values by the entropy encoding module 135 and are transmitted to the decoding device.

The transform module 120 performs a transform process on the residual block in the unit of TUs and generates transform coefficients.

A transform block is a rectangular block of samples and is a block to which the same transform is applied. The transform block may be a TU and may have a quad-tree structure.

The transform module 120 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 120 may construct a transform block of transform coefficients through the transform.

The quantization module 125 may quantize the residual values, that is, transform coefficients, transformed by the transform module 120 and may create quantization coefficients. The values calculated by the quantization module 125 may be supplied to the dequantization module 140 and the rearrangement module 130.

The rearrangement module 130 may rearrange the transform coefficients supplied from the quantization module 125. By rearranging the quantization coefficients, it is possible to enhance the encoding efficiency in the entropy encoding module 135.

The rearrangement module 130 may rearrange the quantized transform coefficients in the form of a two-dimensional block to the form of a one-dimensional vector through the use of a coefficient scanning method.

The entropy encoding module 135 may be configured to entropy code the symbol according to a probability distribution based on the quantized transform values rearranged by the rearrangement module 130 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoding module 135 may store therein a table for performing entropy encoding, such as a variable length coding/code (VLC) table. The entropy encoding module 135 may perform entropy encoding using the stored VLC table. Further, the entropy encoding module 135 derives a binarization method of a corresponding symbol and a probability model of a corresponding symbol/bin, and then performs entropy encoding using the derived binarization method or probability model.

The entropy encoding module 135 may give a predetermined change to a parameter set or syntaxes to be transmitted, if necessary.

The dequantization module 140 dequantizes the values transform coefficients quantized by the quantization module 125. The inverse transform module 145 inversely transforms the values dequantized by the dequantization module 140.

The residual value or residual samples or residual samples array generated by the dequantization module 140 and the inverse transform module 145, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filtering module 155 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

The memory 160 may store the reconstructed block or picture calculated by the filtering module 155. The reconstructed block or picture stored in the memory 160 may be supplied to the prediction module 110 that performs the inter prediction.

Figure 2:
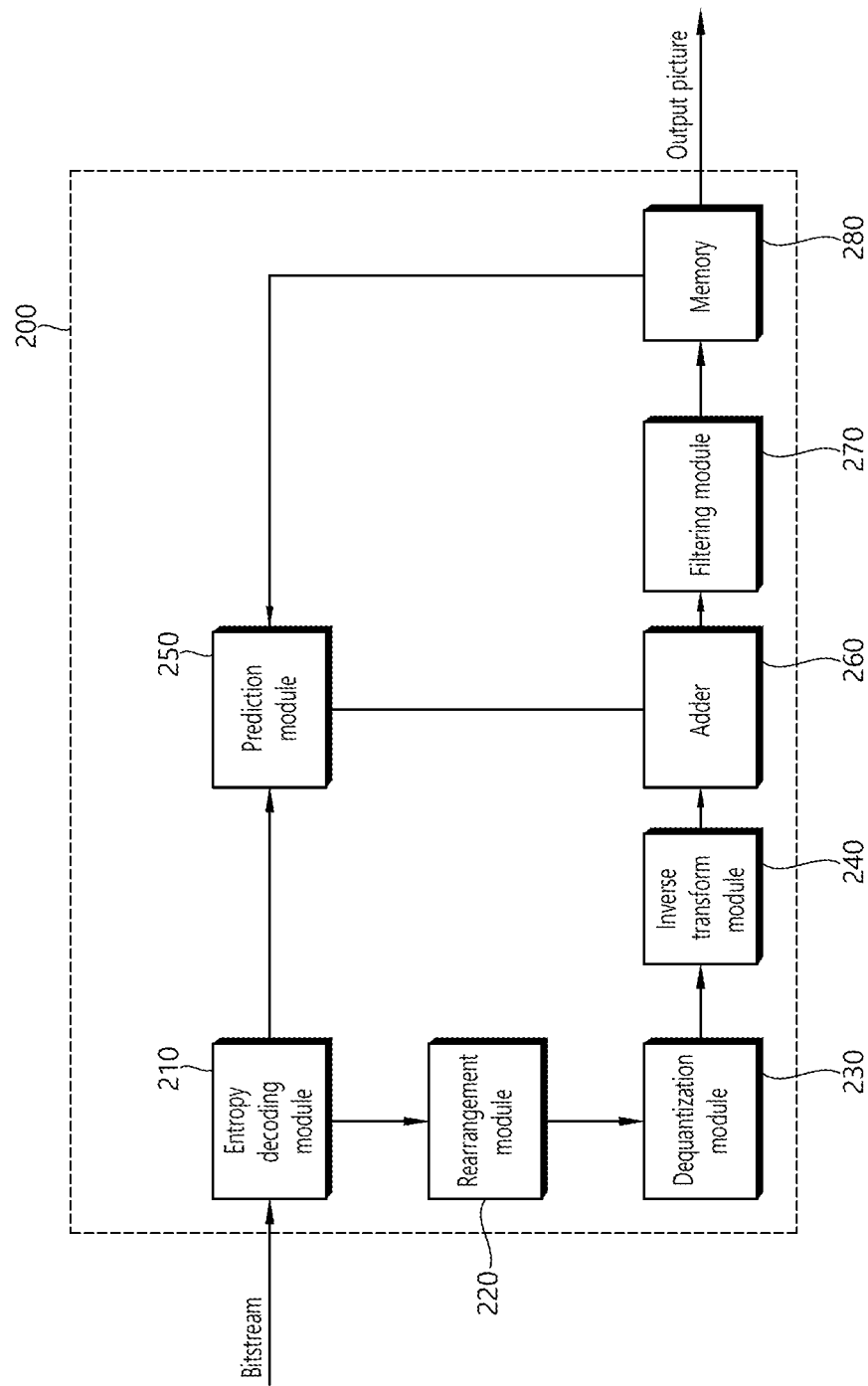
FIG. 2 is a block diagram schematically illustrating a video decoding device according to an embodiment of the invention.

FIG. 2 is a block diagram schematically illustrating a video decoding device according to an embodiment of the invention. Referring to FIG. 2, a video decoding device 200 may include an entropy decoding module 210, a rearrangement module 215, a dequantization module 220, an inverse transform module 225, a prediction module 230, a filtering module 235, and memory 240.

When a video bitstream is input from the video encoding device, the input bitstream may be decoded on the basis of the order in which video information is processed by the video encoding device.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoding module 210 may perform decoding using the same VLC table as the encoding device used in the encoding device. Further, when CABAC is used to perform entropy encoding in a video encoding device, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoding device.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoding device and the coefficient values of the rearranged block.

The inverse transform module 225 may perform the inverse DCT and/or inverse DST of the DCT and/or DST, which has been performed by the transform module of the video encoding device, on the quantization result from the video encoding device.

The inverse transform may be performed on the basis of a transfer unit or a partition unit of a picture determined by the video encoding device. The transform module of the video encoding device may selectively perform the DCT and/or DST depending on plural information pieces such as the prediction method, the size of a current block, and the prediction direction, and the inverse transform module 225 of the video decoding device may perform the inverse transform on the basis of the transform information on the transform performed by the transform module of the video encoding device.

The prediction module 230 generates a prediction block including a predicted sample or a predicted sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Further, the encoding device may transmit a reference picture index indicating a reference picture to the decoding device.

The prediction module 230 of the decoding device may predict the motion vector of the current block using the motion information of the neighboring block and derive the motion vector of the current block using the residual received from the encoding device. The decoding device may generate predicted sample (or predicted sample array) for the current block based on the derived motion vector and the reference picture index information received from the encoding device.

The decoding device may generate reconstructed samples (or reconstructed samples array) by adding predicted sample (or predicted sample array) and residual samples as obtained from transform coefficients sent from the encoding device to each other. Based on these reconstructed samples, reconstructed blocks and reconstructed pictures may be generated.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoding device does not transmit syntax information such as the residual to the decoding device in addition to information indicating which block's motion information to use as the motion information for the current block.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed samples or a reconstructed samples array as described above; the prediction block includes a predicted sample or a predicted sample array; the residual block may include a residual samples or a residual samples array. Therefore, the reconstructed samples or the reconstructed samples array can be considered to be generated by combining the corresponding predicted sample or predicted sample array with the corresponding residual samples or residual samples array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoding module 210, the rearrangement module 215, the dequantization module 220, the inverse transform module 225, the prediction module 230, the filtering module 235 and the memory 240 which are included in the decoding device 200, for example, the entropy decoding module 210, the rearrangement module 215, the dequantization module 220, the inverse transform module 225, the prediction module 230, the filtering module 235, and so on may be expressed as a decoder or a decoding module that is distinguished from other elements.

In addition, the decoding device 200 may further include a parsing module not shown in the drawing that parses information related to the encoded images included in a bitstream. The parsing module may include the entropy decoding module 210, and may be included in the entropy decoding module 210. Such a parsing module may also be implemented as an element of the decoding module.

Inter prediction for the current block may be performed considering the motion of the target object or image between the pictures. However, the conventional inter prediction method is based on a method (translational motion model) that compensates for the translational motion. The translational motion model derives a reference block matching the current block based on a single motion vector to perform inter prediction. Thus, the translational motion model may be called a block matching method. According to the translational motion model, a motion vector $v_x$ in the x-axis direction and a motion vector $v_y$ in the y-axis direction, which are motion parameters for a single motion vector are used on the prediction block (PB) basis to designate a region of a shape and size similar to a prediction block existing in a reference picture as a prediction reference block. Then, the samples in the reference block were used as predicted samples for the prediction block. For example, the inter prediction according to the translational motion model may be derived based on the following equation:

$$\begin{cases} x' = x + a \\ y' = y + b \end{cases} \quad \text{[Equation 1]}$$

In this connection, x and y respectively refer to the x coordinate and y coordinate of each sample in the current block, and a and b represent parameters for compensating the motion for the current block. x' and y' represent the x coordinate and y coordinate of the corresponding sample in the reference picture corresponding to the x and y, respectively. In this case, the $v_x$ and the $v_y$ may be represented by expressions $v_x$=−a, $v_y$=−b.

On the other hand, an object in the actual screen is not limited to a plane motion (i.e., a translational motion). The object may be subjected to a rotation about a specific axis, a deformation of an object shape, a size variation due to a camera zooming and the like. Thus, there have been limitations in expressing the above deformations or movements of the image using the above-described translational motion model method. Hereinafter, deformation of an image may include rotational deformation of the image, shape deformation thereof, and size deformation via zooming thereof.

The present invention provides an inter prediction method considering such deformations of the image. According to the present invention, motion vectors for samples in the current block may be efficiently derived, and the accuracy of the inter prediction may be improved despite the image deformations including the rotation about a specific axis, a deformation of the object shape, the size variation due to a camera zooming in or out, etc. According to the present invention, a prediction model may be called a 2-dimensional affine transform method or an affine motion model. In the motion prediction method according to the present invention, the deformation types of the image may be predicted based on the motion vectors of the control points (CPs) for the current block. By increasing the accuracy of the inter prediction, the compression performance of the image can be improved. Further, according to the present invention, a motion vector for at least one CP for the current block may be derived using the motion vector of the neighboring block. This reduces the data amount of the side information to be added and thus significantly improves the inter prediction efficiency.

In one example of the prediction method according to the present invention, motion information at three CPs, namely at three reference points are required.

Figure 3:
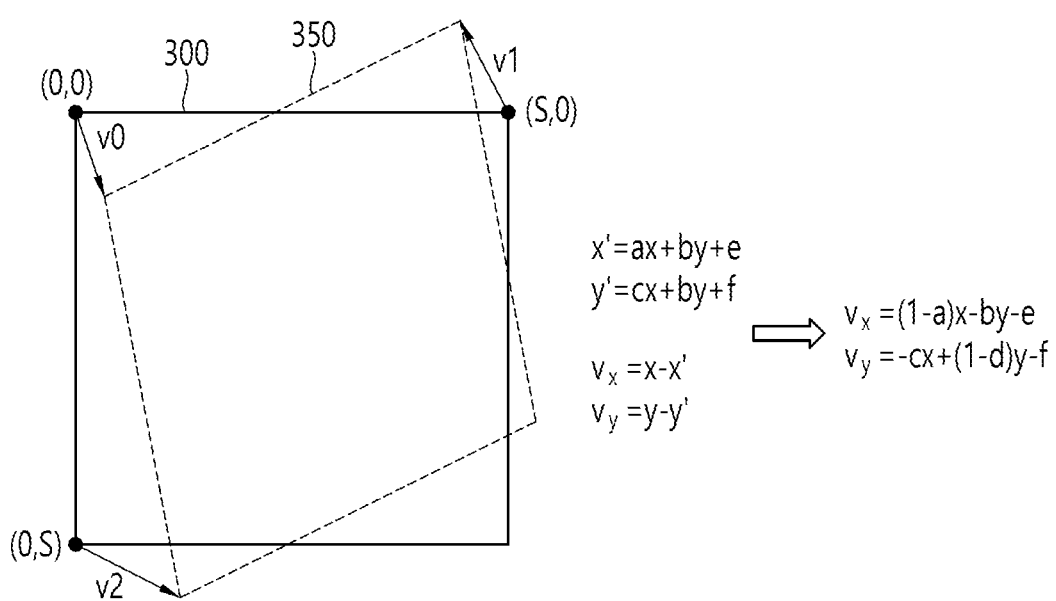
FIG. 3 shows an example of the affine motion model according to the present invention.

FIG. 3 shows an example of the affine motion model according to the present invention. Referring to FIG. 3, it is assumed that the height and width of the current block 300 are equal to S, but this is merely an example. The height and width may be set differently. In this connection, the current block 300 may include a prediction block. The prediction block may be a block derived from a coding block via a partitioning procedure. The specific inter prediction mode, including whether the affine motion model is applied on the prediction block basis, may be determined. For example, whether inter prediction or intra prediction is applied is determined on the coding block basis. In a case where inter prediction is applied to the coding block including the prediction block, it may be determined whether a specific inter prediction mode is applied to the prediction block.

Referring to FIG. 3, x and y represent the x coordinate and y coordinate of each sample in the current block 300, respectively. x' and y' represent the x coordinate and y coordinate of the corresponding sample in the reference picture corresponding to the x and y, respectively. In this case, a region containing the sample of the sample position pointed to by (x', y') may be referred to as a reference block 350 or reference region 350. In this case, the reference block 350 may correspond to a region including an image deformed via the rotation deformation, shape deformation, and the size deformation via zoom in or zoom of the image in the current block 300. Therefore, the size and shape of the reference block 350 may be different from the size and shape of the current block 300.

When the top-left sample position in current block 300 is (0, 0) the x and y may be determined based on the top-left sample position (0, 0). Further, the x' and y' may be determined based on the coordinate of the same position as or a position corresponding to the top-left sample position of the current block 300 within the reference picture.

As shown in FIG. 3, the x' and y' may be derived based on a following equation:

$$\begin{cases} x' = ax + by + e \\ y' = cx + dy + f \end{cases} \quad \text{[Equation 2]}$$

In this connection, a, b, c, d, e, and f represent parameters for compensating for the motion of the current block. In this case, $v_x$ and $v_y$ may be expressed as $v_x$=x−x', $v_y$=y−y'. The above equations may be summarized as follows. That is, the motion vector of the affine motion model may be derived based on a following equation:

$$\begin{cases} v_x = (1-a)x - by - e \\ v_y = -cx + (1-d)y - f \end{cases} \quad \text{[Equation 3]}$$

In this connection, $v_x$ represents the x component of the motion vector of the (x, y) coordinate sample in the current block 300. $v_y$ represents the y component of the motion vector of the (x, y) coordinate sample in the current block 300. That is, ($v_x$, $v_y$) becomes the motion vector for the (x, y) coordinate sample. Thus, the affine motion model may have different or unique motion vectors depending on sample coordinates in the current block.

Figure 4:
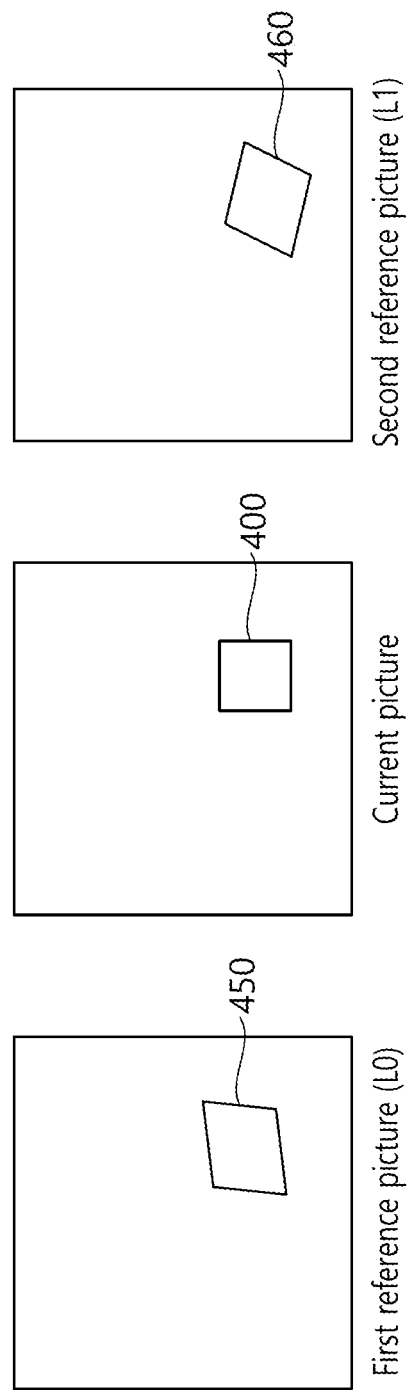
FIG. 4 illustrates a prediction direction and reference region according to the affine motion model.

FIG. 4 illustrate the prediction direction and reference region according to the affine motion model.

Referring to FIG. 4, when prediction for the current block 400 in the current picture is performed according to the affine motion model, a reference region 450 or 460 may be positioned as shown in FIG. 4.

One or two reference picture lists may be used to predict the current block. That is, a reference picture list 0 or reference picture list 1 may be used for predicting the current block. Alternatively, both reference picture lists 0 and 1 may be used. For example, if the slice type of the slice containing the current block is B (B slice), at least one of the two reference picture lists may be used. If the slice type of the slice containing the current block is P (P slice), only the reference picture list 0 may be used. The reference picture list 0 may be called L0, and the reference picture list 1 may be called L1. In performing prediction for the current block, when performing inter prediction based on the L0, such prediction may be referred to as L0 prediction. In case of performing inter prediction based on the L1, this prediction may be called L1 prediction. If inter prediction is performed based on both the L0 and L1, this prediction may be referred to as BI-prediction (i.e., combining L0 prediction and L1 prediction). In this case, a separate motion vector may be used for each of L0 prediction and L1 prediction. In other words, according to the affine motion model, when a sample-based motion vector is derived, a separate motion vector may be derived on the sample basis depending on whether the L0 prediction and/or L1 prediction is applied. For example, a motion vector MVL0 for L0 prediction and a motion vector MVL1 for L1 prediction for the first sample in the current block may be separately derived.

For example, When, in FIG. 4, the first reference picture is a decoded picture included in the L0, the slice type of the slice containing the current block 400 is P, or B, and the L0 is used, the first reference picture may be used to predict the current block 400 according to the present invention. In this case, the reference region 450 in the first reference picture may be derived based on the motion vectors of the current block 400 derived according to the above-described affine motion model. Further, predicted samples of the current block 400 may be derived based on the reconstructed samples in the reference region 450.

On the other hand, when, in FIG. 4, the first reference picture is a decoded picture included in L0, and the second reference picture is the decoded picture contained in L1, and the slice type of the slice containing the current block 400 is B, and both L0 and L1 (i.e., BI) are used, the first reference picture and the second reference picture may be used for the prediction of the current block 400 according to the present invention. In this case, the reference region 450 in the first reference picture may be derived based on motion vectors for L0 prediction of the current block 400 derived according to the affine motion model described above. Further, this approach may derive the reference region 460 in the second reference picture based on the motion vectors for L1 prediction. In this case, predicted samples of the current block 400 may be derived based on reconstructed samples in the reference region 450 and reconstructed samples in the reference region 460. In this case, the predicted samples of current block 400 may be derived, for example, via the weighted sum between the reconstructed samples in reference region 450, and the reconstructed samples in reference region 460. In this connection, the weighed sum may be based on the first temporal spacing between the current picture and the first reference picture and the second temporal spacing between the current picture and the second reference picture. In this connection, the temporal spacing refers to the POC (picture order count) difference. That is, the difference between the POC value of the current picture and the POC value of the first reference picture may be the first temporal spacing. The difference between the POC value of the current picture and the POC value of the second reference picture may be the second temporal spacing.

Hereinafter, in order to avoid duplication of descriptions, the case in which one of the L0 prediction and L1 prediction is applied will be described below. It has been described above that motion vectors for L0 prediction and motion vectors for L1 prediction may be separately derived based on this description below. Further, it has been described above that the BI prediction may be performed based on this description below.

According to the affine motion model, a sample-based (that is, pixel-based) motion vector may be derived, and the accuracy of the inter prediction can be significantly improved. However, according to the affine motion model, the complexity in the motion compensation process may be increased. For example, the motion vector expression for the translational motion model may be expressed as $v_x=-a$, $v_y=-b$. Thus, to use the translational motion model, it is necessary to receive information about the two parameters a and b to compensate for the motion for the current block, while, to use the affine motion model, it is necessary to receive and/or derive information on the six parameters a, b, c, d, e, and f appearing in the Equation 3.

Generally, the method using the affine motion model may increase the data to be encoded, compared with the existing translational motion model (or block matching method) with a single motion information piece per a prediction block. That is, since the data amount of the side information to be transmitted to the decoder may be increased, it is necessary to reduce the data amount of the side information in order to increase the coding efficiency. Therefore, according to the present invention, the coding efficiency may be increased by reducing the amount of data of the side information via the following method.

Figure 5:
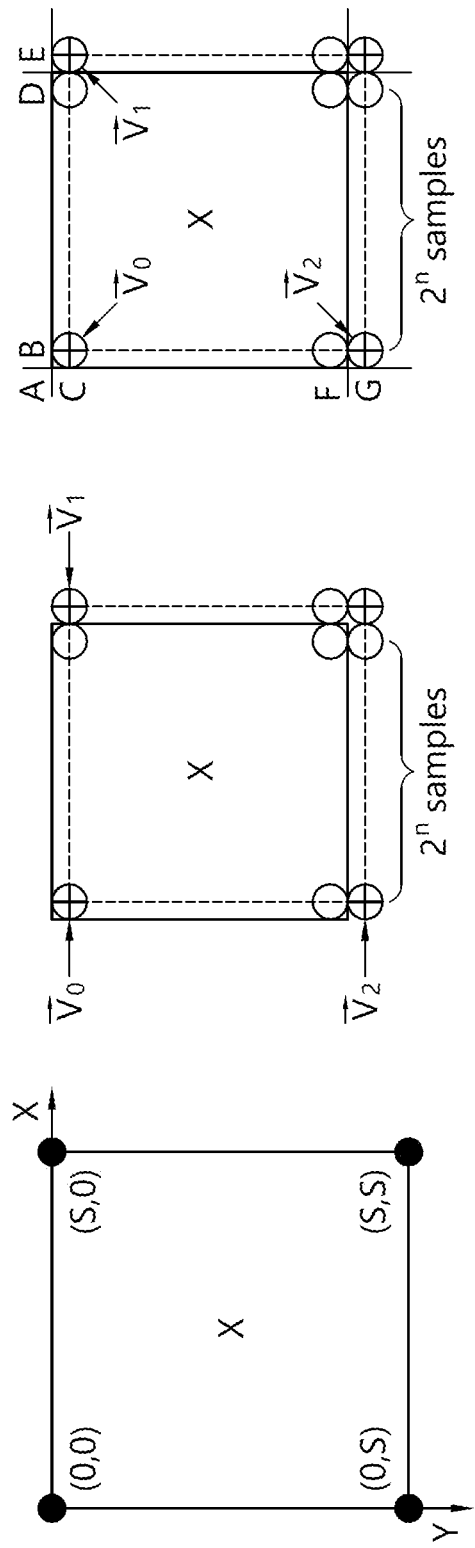
FIGS. 5A-5C show positions of CPs for a block illustratively.

FIGS. 5A-5C show positions of the CPs for the block illustratively.

To apply the affine motion model, control points must be defined. Motion vectors for the samples in the current block may be derived based on the motion vectors at the control points.

Reference to FIG. 5A, a block X with a height S and a width S is present. In this case, for example, the corner coordinate positioned at the top-left of the block X may be expressed as (0, 0), the top-right corner coordinate may be expressed as (S, 0). The bottom-left corner coordinate may be expressed as (0, S). Finally, the bottom-right corner coordinate may be expressed as (S, S). As shown in FIG. 5A or 5B, when coordinates are represented based on the sample positions, the coordinate of the top-left sample in the block X may be expressed as (0, 0), the coordinate of the sample moved to the right by a width S from the top-left sample may be expressed as (S, 0), the coordinate of the sample moved downwardly by a height S from the top-left sample may be expressed as (0, S). The coordinate of the sample shifted to the right and downwardly by the width S and height S, respectively, from the top-left sample may be expressed as (S, S). Referring to FIG. 5B, there are samples of (0, 0), (S, 0), (0, S) and (S, S) marked with a circle with a cross therein. The samples of the (S, 0), (0, S), and (S, S) coordinates are considered to be included in the neighboring blocks to the current block X.

To apply the affine motion model, samples of the (0, 0) (S, 0), (0, S) coordinates may be defined as control points. In this connection, this method defines the samples of the (0,0) (S, 0) and (0, S) coordinates as control points $(x_i, y_i)_{,i=0,1,2}$ respectively. The motion vector at each control point may be expressed as $(v_i)=(v_{xi}, v_{yi})_{,i=0,1,2}$. Hereinafter, the control point of the (0, 0) coordinate may be referred to as CP0, the control point of the (S, 0) coordinate may be referred to as CP1, the control point of the (0, S) coordinate may be called CP2. The motion vector of the CP0 may expressed as v0, the motion vector of the CP1 may be expressed as v1, and the motion vector of the CP2 may be represented as v2. In this example, it is assumed that each of the height and width of the block X is equal to S. The present invention is not limited to this. When the height of the block X is H and the width thereof is W, the control points may have coordinates of (0, 0), (W, 0), (0, H). W or H instead of S may be inserted into the following equations or based on the equations.

The equation of the affine motion model may be solved using each control point and each motion vector of a corresponding control point. In this connection, the parameters a, b, c, d, e, and f of the equation of the affine motion model may be derived based on the following equation:

$$\begin{cases} a = 1 - \dfrac{v_{x_1} - v_{x_0}}{W}, b = \dfrac{v_{x_0} - v_{x_2}}{H}, e = -v_{x_0} \\ c = \dfrac{v_{y_0} - v_{y_1}}{W}, d = 1 - \dfrac{v_{y_2} - v_{y_0}}{H}, f = -v_{y_0} \end{cases} \quad \text{[Equation 4]}$$

In this connection, $v_{x0}$ and $v_{y0}$ represent the x component and y component of the motion vector of CP0 respectively, $v_{x1}$ and $v_{y1}$ represent the x component and y component of the motion vector of CP1, respectively, and $v_{x2}$ and $v_{y2}$ represent the x component and y component of the motion vector of CP2, respectively. When each of the W and the H are equal to S, the parameters a, b, c, d, e, and f may be derived based on the following equation:

$$\begin{cases} a = 1 - \dfrac{v_{x1} - v_{x0}}{S}, b = \dfrac{v_{x0} - v_{x2}}{S}, e = -v_{x0} \\ c = \dfrac{v_{y0} - v_{y1}}{S}, d = 1 - \dfrac{v_{y2} - v_{y0}}{S}, f = -v_{y0} \end{cases}$$ [Equation 5]

In this connection, $v_{x0}$ and $v_{y0}$ represent the x component and y component of the motion vector of CP0 respectively, $v_{x1}$ and $v_{y1}$ represent the x component and y component of the motion vector of CP1, respectively, and $v_{x2}$ and $v_{y2}$ represent the x component and y component of the motion vector of CP2, respectively.

Based on the parameters of the Equation 1, the motion vector of the (x, y) coordinate sample in the block X may be derived based on the following Equation:

$$\begin{cases} v_x = \dfrac{v_{x1} - v_{x0}}{W}x + \dfrac{v_{x2} - v_{x0}}{H}y + v_{x0} \\ v_y = \dfrac{v_{y1} - v_{y0}}{W}x + \dfrac{v_{y2} - v_{y0}}{H}y + v_{y0} \end{cases}$$ [Equation 6]

When each of the W and the H is equal to S, then the motion vector of the (x, y) coordinate sample in the block X may be derived based on a following Equation:

$$\begin{cases} v_x = \dfrac{v_{x1} - v_{x0}}{S}x + \dfrac{v_{x2} - v_{x0}}{S}y + v_{x0} \\ v_y = \dfrac{v_{y1} - v_{y0}}{S}x + \dfrac{v_{y2} - v_{y0}}{S}y + v_{y0} \end{cases}$$ [Equation 7]

In this connection, while knowing the motion vector of the CP0, the motion vector of the CP1, and the motion vector of the CP2, a motion vector according to the sample position in the current block may be derived according to the above Equation. That is, according to the affine motion model, the motion vector of the sample position may be derived using motion vectors v0($v_{x0}$, $v_{y0}$), v1($v_{x1}$, $v_{y1}$), v2($v_{x2}$, $v_{y2}$) at the control points, based on the ratio of the distances between the coordinate (x, y) of the target sample and the three control points. In this case, as may be seen in FIG. 5B, the samples of (S, 0), (0, S) and (S, S) coordinates except the top-left sample may be included in the neighboring blocks adjacent to the block X. The mesh grids of the neighboring blocks are overlapped with each other, so that the prediction using the affine motion model may be performed intuitively.

FIG. 5C shows the CPs and neighboring samples used to derive motion vectors of the CPs. Circles A, B, C, D, E, and F, which do not have a cross shape therein, represent the neighboring samples. The motion vectors of the neighboring samples A, B, and C may be used to derive the vector v0. The motion vectors of the neighboring samples D and E may be used to derive the vector v1. The motion vectors of the neighboring samples F, G may be used to derive the vector v2. In other words, the motion vectors of the neighboring samples A, B, and C may be used as the prediction candidate group for the vector v0. The motion vectors of the neighboring samples D, E may be used as the prediction candidate group for the vector v1. The motion vectors of the neighboring samples F, G may be used as the prediction candidate group for the vector v2. The motion vectors of all neighboring samples may be used as a prediction candidate group. If there is no overlapping motion vector, a set of candidate groups containing a total of 12 prediction candidates may be used to derive the motion vector of each CP.

On the other hand, as described in the above-described embodiment, when the motion vector of each CP is derived, the complexity for calculating motion information may increase. The encoding device may compute the rate-distortion (RD) costs for up to 12 prediction candidates and compare them with each other. The device may perform an iteration operation to determine the MVD value of each CP. In order to decode a unary code of the received MV (prediction) index, the decoding device may obtain a deformation measurement value for each MV (prediction) candidate and may store the MV (prediction) candidates in ascending order based on the deformation measurement value of each MV (prediction) candidate. The deformation measurement value may be obtained based on the following Equation:

$$D(\vec{V}) = \|\vec{v}_0 - \vec{v}_1\|_1 + \|\vec{v}_2 - \vec{v}_1\|_1$$ [Equation 8]

In this connection, D(V) represents the deformation measurement value. v0 denotes a MV (prediction) candidate of the CP0, v1 denotes a MV (prediction) candidate of the CP1, and v2 denotes a MV (prediction) candidate of the CP2.

The decoding device receives index information to derive optimal MV (prediction) candidates for the CPs. If the inter prediction mode for the current block is not a merge mode or a skip mode, the decoding device may receive more MVDs for each CP.

When defining the CP0 as a top-left sample in the current block as described above and applying the affine motion model using the CP1 and the CP2 as samples in the top-right and bottom-left neighboring blocks, there is an advantage that the prediction may be performed more accurately despite the deformation of the image varies. However, the amount of data of the side information to be transmitted may be increased. This approach defines three CPs on a block basis. The motion vector information for each CP is to be transmitted. Thus, an additional bits of up to 10 bits or more may be required compared with the conventional method for deriving a motion vector on a block basis.

Therefore, in order to reduce the side information and to apply the more efficient affine motion model, motion vectors for the CPs may be derived based on the already decoded neighboring blocks by changing the positions of the CPs for the current block.

Figure 6:
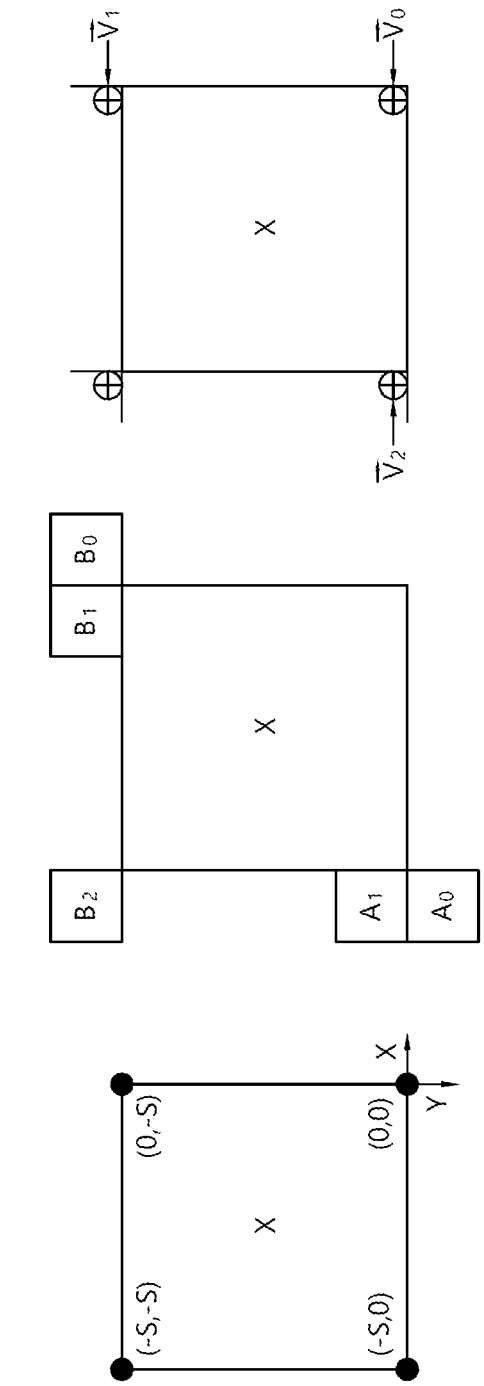
FIGS. 6A-6C show positions of CPs based on the bottom-right sample in the block, and candidate blocks for deriving the motion vector and the motion vector of each CP.

FIGS. 6A-6C shows the positions of the CPs based on the bottom-right sample in the block, the motion vector of each CP, and candidate blocks for deriving the motion vector. The block X may correspond to the current block. For example, the block X may be a prediction block (PB).

Reference to FIG. 6A, a block X with a height S and a width S is present. In this case, for example, the corner coordinate positioned at the bottom-right of the block X may be expressed as (0, 0). As shown in FIG. 6A, when coordinates are represented based on the sample positions, the coordinate of the bottom-right sample in the block X may be expressed as (0, 0), the coordinate of the sample moved upwardly by a height S from the bottom-right sample may be expressed as (0, −S), the coordinate of the sample moved to the left by a width S from the bottom-right sample may be expressed as (−S, 0). The coordinate of the sample shifted to the left and upwardly by the width S and height S, respectively, from the bottom-right sample may be expressed as (−S, −S).

FIG. 6C shows the CPs of the block X and the motion vector of each CP. To apply the affine motion model, the approach may define (0, 0), (0, −S), (−S, 0) coordinate samples as CPs. Hereinafter, the (0,0) coordinate CP may be expressed as CP0, the (0,−S) coordinate CP may be expressed as CP1, and the (−S,0) coordinate CP may be expressed as CP2. The motion vector of the CP0 may be defined as v0, the motion vector of the CP1 as v1, and the motion vector of the CP2 as v2. In this example, it is assumed that block X has the same height and width as S. The invention is not limited thereto. If the height of the block X is H and the width thereof is W, the CPs may have coordinates such as (0, 0), (−W, 0), (0, −H). Further, W or H instead of S may be inserted into equations described below or based on the equations. In this case, since the neighboring blocks to which the CP1 and CP2 belong are already reconstructed, he decoded information of the reconstructed neighboring blocks may be employed to derive v1 and v2, without a separate prediction process.

On the other hand, the vector v0 may be derived as a motion vector with the lowest Lagrangian cost using the block matching method. The vector v0 may be derived as a motion vector with the lowest RD cost by applying an affine motion model that reflects the motion information of neighboring blocks to the block X. The encoding device may transmit the motion information for the vector v0 in a manner transmitting in an AMVP or merge mode.

The equation of the affine motion model may be solved by using each control point and the motion vector of the corresponding control point. In this connection, the parameters a, b, c, d, e, and f of the equation of the affine motion model may be derived based on the following equation:

$$\begin{cases} a = 1 + \frac{v_{x_2} - v_{x_0}}{W}, b = \frac{v_{x_1} - v_{x_0}}{H}, e = -v_{x_0} \\ c = \frac{v_{y_2} - v_{y_0}}{W}, d = 1 + \frac{v_{y_1} - v_{y_0}}{H}, f = -v_{y_0} \end{cases}$$ [Equation 9]

In this connection, $v_{x0}$ and $v_{y0}$ represent the x component and y component of the motion vector of CP0, respectively. $v_{x1}$ and $v_{y1}$ denote the x component and y component of the motion vector of CP1, respectively. $v_{x2}$ and $v_{y2}$ represent the x component and y component of the motion vector of CP2, respectively. If each of the W and the H is equal to S, then the parameters a, b, c, d, e, and f may be derived based on the following equation:

$$\begin{cases} a = 1 + \frac{v_{x_2} - v_{x_0}}{S}, b = \frac{v_{x_1} - v_{x_0}}{S}, e = -v_{x_0} \\ c = \frac{v_{y_2} - v_{y_0}}{S}, d = 1 + \frac{v_{y_1} - v_{y_0}}{S}, f = -v_{y_0} \end{cases}$$ [Equation 10]

In this connection, $v_{x0}$ and $v_{y0}$ represent the x component and y component of the motion vector of CP0, respectively. $v_{x1}$ and $v_{y1}$ denote the x component and y component of the motion vector of CP1, respectively. $v_{x2}$ and $v_{y2}$ represent the x component and y component of the motion vector of CP2, respectively.

Based on the parameters of Equation 9, the motion field, which is a set of motion vectors of the samples in the block X, may be derived based on a following Equation. In other words, the motion vector of the (x, y) coordinate sample in the block X may be derived based on the following equation:

$$\begin{cases} v_x = \frac{v_{x_0} - v_{x_2}}{W}x + \frac{v_{x_0} - v_{x_1}}{H}y + v_{x_0} \\ v_y = \frac{v_{y_0} - v_{y_2}}{W}x + \frac{v_{y_0} - v_{y_1}}{H}y + v_{y_0} \end{cases}$$ [Equation 11]

If each of the W and the H is equal to S, then the motion vector of the (x, y) coordinate sample in the block X may be derived based on a following Equation:

$$\begin{cases} v_x = \frac{v_{x_0} - v_{x_2}}{S}x + \frac{v_{x_0} - v_{x_1}}{S}y + v_{x_0} \\ v_y = \frac{v_{y_0} - v_{y_2}}{S}x + \frac{v_{y_0} - v_{y_1}}{S}y + v_{y_0} \end{cases}$$ [Equation 12]

In this connection, while knowing the motion vector of the CP0, the motion vector of the CP1, and the motion vector of the CP2, a motion vector according to the sample position in the current block may be derived according to the above Equation. That is, according to the affine motion model, the motion vector of the sample position may be derived using motion vectors v0($v_{x0}$, $v_{y0}$), v1($v_{x1}$, $v_{y1}$), v2($v_{x2}$, $v_{y2}$) at the control points, based on the ratio of the distances between the coordinate (x, y) of the target sample and the three control points. In this case, the motion vector of the sample position may be derived based on the motion vectors.

On the other hand, the encoding device may transmit the affine motion flag to the decoding device on the prediction unit basis. The encoding device may determine the value of the flag according to the RD cost calculation result. For example, the decoding device may apply the affine motion model if the value of the received affine motion flag is 1. For example, if the value of the affine motion flag is 0, the decoding device may apply the existing translational motion model. The present approach may compensate for deformations due to image rotation and zooming more precisely using only 1 bit signaling overhead, compared with the inter prediction method using the translational motion model. Further, the motion vector of the already derived neighboring block may be used. Thus, it is not necessary to calculate the motion information of the CPs or to additionally construct the MV (prediction) candidate group as disclosed above with reference to the method of FIGS. 5A-5C, so that the implementation complexity may be lowered. On the other hand, for example, the affine motion flag may be transmitted using a syntax as shown in Table 1 and Table 2 below. The syntax, for example, the CU syntax, as in Table 1 may include the affine motion flag after the skip flag. For example, the syntax may be PU syntax as shown in Table 2, where the syntax may be included in bitstream and transmitted in the bitstream.

TABLE 1

| coding_unit( x0, y0, log2CbSize ) { | Descriptor |
| --- | --- |
| if( transquant_bypass_enabled_flag ) | |
| cu_transquant_bypass_flag | ae(v) |
| if( slice_type != I ) { | |
| cu_skip_flag[ x0 ][ y0 ] | ae(v) |
| affine_motion_flag[ x0 ][ y0 ] | ae(v) |

TABLE 2

| prediction_unit( x0, y0, nPbW, nPbH ) { | Descriptor |
|---|---|
| affine_motion_flag [ x0 ][ y0 ] | ae(v) |
| if( cu_skip_flag[ x0 ][ y0 ] ) { | |
| if( MaxNumMergeCand > 1 ) | |

Referring to the above Table 1 and Table 2, the affine motion flag syntax element corresponds to the affine motion flag.

Again referring to FIGS. 6A-6C, FIG. 6B shows the spatial candidate list used when AMVP mode is applied. The vector v1 and the vector v2 needed to apply the affine motion model of the block X may be derived based on the availability of the spatial candidates (neighboring candidate blocks). In this case, which neighboring candidate block for which a sample-based or block-based motion vector is used as the vector v1 and the vector v2 may be determined, based on the availability of the neighboring candidate blocks.

Figure 7:
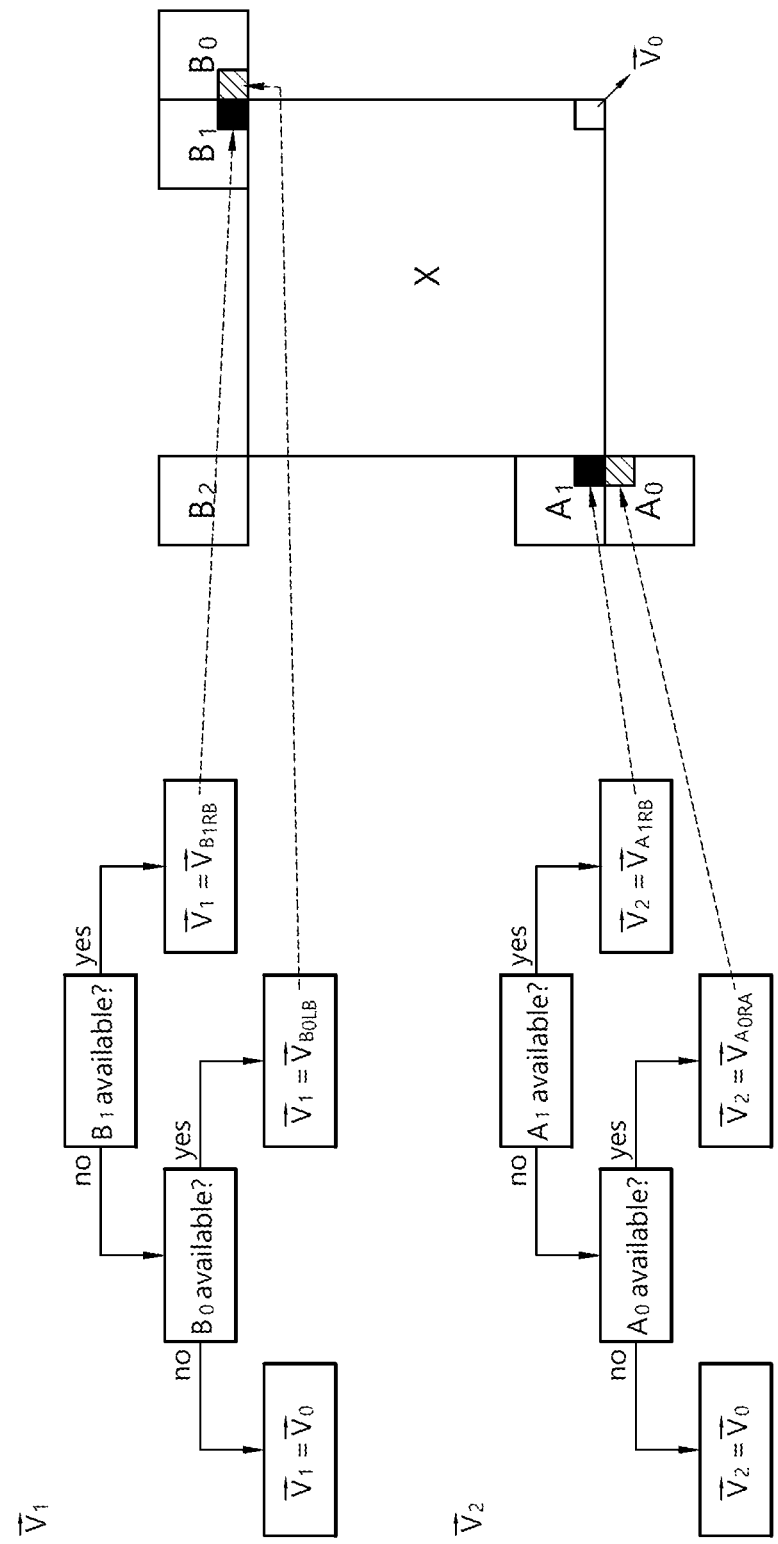
FIG. 7 illustrates a determination process based on the availability of the neighboring candidate blocks of v1 and v2.

FIG. 7 shows the determination process according to the availability of the neighboring candidate blocks of the vector v1 and the vector v2. On the other hand, the availability of the neighboring candidate blocks may be determined based on the following conditions.

If neighboring candidate blocks exist, the availability of the neighboring candidate blocks may be determined as follows. For example, the position of a neighboring candidate block should exist in the picture and/or slice, and the corresponding neighboring candidate block should be a block referable to in terms of the coding sequence. For example, a case where the neighboring candidate block is non-available may include a case where the position of the corresponding neighboring block is positioned at the outer edge of the current picture (for example, if the current block is positioned adjacent to the left boundary of the current picture, the top-left neighboring block or the bottom-left neighboring block to the current block may be determined not to be available), or a case where the corresponding neighboring block is positioned on a slice or tile other than that in the current block. In this connection, slice may be a sequence of integer CTUs. The CTUs in the slice may be included in an independent slice segment and sequential dependent slice segments. The tile is a rectangular region containing CTUs (CTBs). The rectangular region may be identified based on a specific tile row and a specific tile column in the picture.

FIG. 7 shows an exemplary flowchart for determination of the availability of neighboring candidate blocks to determine the vectors v1 and v2, and the neighboring candidate blocks.

For example, if a neighboring candidate block B1 is available, the vector v1 may be derived as the motion vector of the bottom-right sample of the neighboring candidate block B1. If the neighboring candidate block B1 is non-available, the availability of the neighboring candidate block B0 may be determined. For example, if the neighboring candidate block B1 is not available and the neighboring candidate block B0 is available, the vector v1 may be derived as the motion vector of the bottom-left sample of the neighboring candidate block B0. For example, if the neighboring candidate block B0 and the neighboring candidate block B1 are both non-available, the vector v1 may be derived as the same motion vector as the vector v0. If the affine motion model is not applied to the neighboring candidate block B1, the block-based motion vector of the neighboring candidate block B1 may be derived as the motion vector of the bottom-right sample. Similarly, if the affine motion model is not applied to the neighboring candidate block B0, the block-based motion vector of the neighboring candidate block B0 may be derived as the motion vector of the bottom-left sample.

For example, if a neighboring candidate block A1 is available, the vector v2 may be derived as the motion vector of the bottom-right sample of the neighboring candidate block A1. If the neighboring candidate block A1 is non-available, the availability of the neighboring candidate block A0 may be determined. For example, if the neighboring candidate block A1 is not available and the neighboring candidate block A0 is available, the vector v2 may be derived as the motion vector of the top-right sample of the neighboring candidate block A0. For example, if the neighboring candidate block A0 and the neighboring candidate block A1 are both non-available, the vector v2 may be derived as the same motion vector as the vector v0. If the affine motion model is not applied to the neighboring candidate block A1, a block-based motion vector of the neighboring candidate block A1 may be derived as a motion vector of the bottom-right sample. Likewise, if the affine motion model is not applied to the neighboring candidate block A0, the block-based motion vector of the neighboring candidate block A0 may be derived as the motion vector of the top-right sample.

On the other hand, in the same way as the method for determining the vector v1 and the vector v2 based on the availability determination described above, the vector v1 and the vector v2 may be determined based on the determination result about whether to apply the inter mode to the neighboring candidate block. This is because it is difficult to determine the motion tendency of the image for the current block when the intra prediction mode is applied to the neighboring candidate block.

For example, if an inter mode is applied to neighboring candidate block B1, the vector v1 may be derived as the motion vector of the bottom-right sample of the neighboring candidate block B1. If the inter mode is not applied to the neighboring candidate block B1, it may be determined whether or not the inter mode is applied to the neighboring candidate block B0. For example, if the inter-mode is not applied to the neighboring candidate block B1 and the inter-mode is applied to the neighboring candidate block B0, the vector v1 may be derived as the motion vector of the bottom-left sample of the neighboring candidate block B0. For example, if the inter-mode is not applied to both the neighboring candidate block B0 and the neighboring candidate block B1, the vector v1 may be derived as the same motion vector as the vector v0. If the affine motion model is not applied to the neighboring candidate block B1, the motion vector of the block unit of the neighboring candidate block B1 may be derived as the motion vector of the bottom-right sample. Similarly, if the affine motion model is not applied to the neighboring candidate block B0, the motion vector of the block unit of the neighboring candidate block B0 may be derived as the motion vector of the bottom-left sample.

For example, if inter mode is applied to a neighboring candidate block A1, the vector v2 may be derived as the motion vector of the bottom-right sample of the neighboring candidate block A1. If the inter-mode is not applied to the neighboring candidate block A1, the present approach may determine whether or not to apply the inter mode to the neighboring candidate block A0. For example, if the inter-mode is not applied to the neighboring candidate block A1 and the inter-mode is applied to the neighboring candidate block A0, the vector v2 may be derived as the motion vector of the top-right sample of the neighboring candidate block A0. For example, if the inter mode is not applied both to the neighboring candidate block A0 and to the neighboring candidate block A1, the vector v2 may be derived as the same motion vector as the vector v0. If the affine motion model is not applied to the neighboring candidate block A1, the motion vector of the block unit of the neighboring candidate block A1 may be derived as the motion vector of the bottom-right sample. Similarly, if the affine motion model is not applied to the neighboring candidate block A0, the motion vector of the block unit of the neighboring candidate block A0 may be derived as the motion vector of the top-right sample.

As expressed in FIG. 6A, assuming that the bottom-right sample position in block X is a coordinate (0, 0), the motion vectors of the samples except for the bottom-right sample of the block X may be derived based on Equation 11 described above. The motion vector of the bottom-right sample with the coordinate of (0, 0) is denoted as v0. The vector v0 may be derived using the same method as deriving the motion vector of the block unit of block X.

Figure 8:
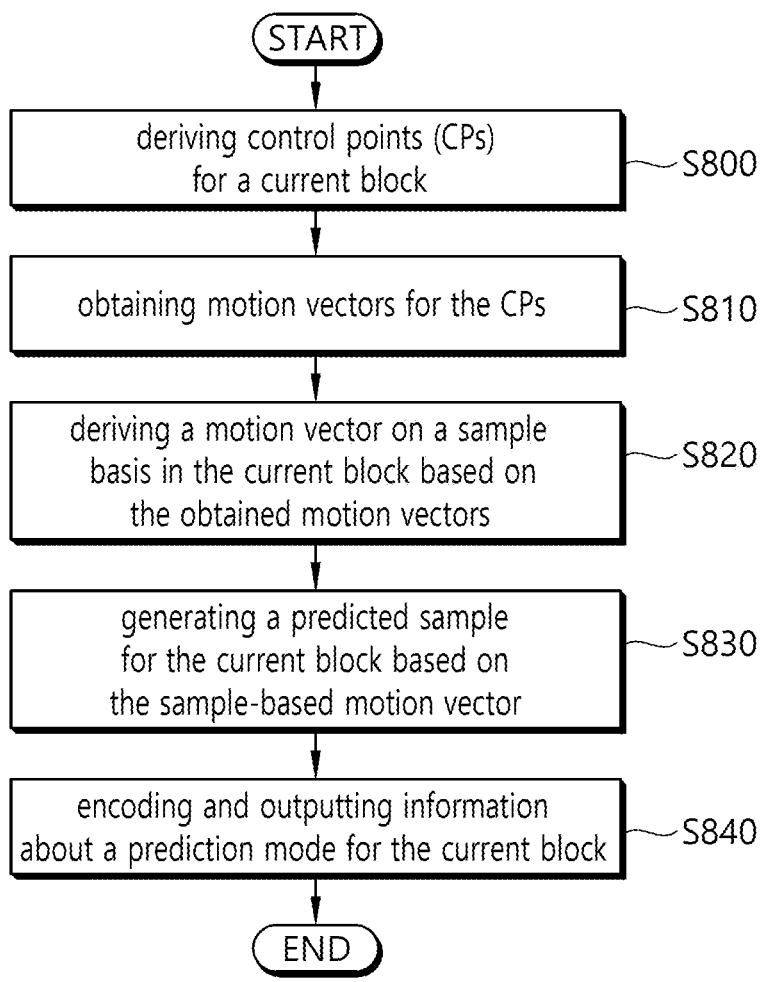
FIG. 8 schematically shows a video encoding method by the encoding device according to the present invention.

FIG. 8 schematically shows the video encoding method by the encoding device according to the present invention. The method disclosed in FIG. 8 may be performed by the encoding device in FIG. 1. Specifically, for example, in FIG. 8, S800 to S830 may be performed by the prediction module of the encoding device. S840 may be performed by the entropy encoding module of the encoding device.

The encoding device derives the control points (CPs) for the current block (S800). The encoding device may determine whether to apply the affine motion model to the current block based on the RD cost. If the affine motion model is applied to the current block, the encoding device may derive the CPs to apply the affine motion model. The CPs may be three.

For example, when the height and width of the current block are H and W, respectively, and the coordinate of the bottom-right sample position of the current block is set to (0, 0), the encoding device may derive three CPs: The coordinate of CP0 is (0, 0), the coordinate of CP1 is (0, –H), and the coordinate of CP2 is (–W, 0). That is, the encoding device may derive the CP0 as the sample having the sample position (0, 0), the CP1 as the sample having the sample position (0, –H) and the CP2 as the sample with the sample position (–W, 0). Alternatively, when each of the height and width of the current block is S, and the coordinate of the bottom-right sample position of the current block is set to (0, 0), the encoding device may derive three CPs: The coordinate of CP0 is (0, 0), the coordinate of CP1 is (0, –s), and the coordinate of CP2 is (–S, 0). That is, the encoding device may derive the CP0 as the sample with the sample position (0, 0), CP1 as the sample with sample position (0, –H) and CP2 as the sample with sample position (–W, 0).

The encoding device acquires motion vectors for the CPs (S810).

If the coordinate of the bottom-right sample position of the current block is (0, 0), the encoding device may derive the motion vectors of the CPs based on the motion vector for the current block, and the neighboring block to the current block.

For example, the motion vector of the CP0 may be derived as a motion vector with the lowest Lagrangian cost using only the block matching algorithm. For example, the motion vector of the CP0 may be derived as a motion vector with the lowest RD cost by applying an affine motion model that reflects the motion information of the neighboring blocks. For example, the encoding device may derive the motion vector for the current block based on the RD cost. The encoding device may derive the motion vector for the current block as the motion vector of the CP0.

The motion vector of the CP1 and the motion vector of the CP2 may be derived based on neighboring blocks. The encoding device may derive, as the neighboring block group 1, the top-right neighboring block to the current block, and the top and rightmost neighboring block among the top neighboring blocks neighboring to the top boundary of the current block. The encoding device may derive, as the neighboring block group 2, the bottom-left neighboring block to the current block, and the lowest and left neighboring block among the left neighboring blocks adjacent to the left boundary of the current block. The motion vector of the CP1 may be derived based on the neighboring block group 1, while the motion vector of the CP2 may be derived based on the neighboring block group 2.

As for the motion vector of the CP1 and the motion vector of the CP2, which neighboring block for which a sample-based or block-based motion vector will be used as the motion vector of the CP1 and the motion vector of the CP2 may be determined based on availability the neighboring block groups and/or whether to apply the inter prediction mode thereto. In the following, a case where a block is not available may include the case where the corresponding block is not coded in inter prediction mode or the inter mode is not applied thereto. Specifically, if the top neighboring block of the neighboring block group 1 is available, the encoding device may derive the motion vector for the CP1 based on the top neighboring block. If the top neighboring block is not available and the top-right neighboring block is available, the encoding device may derive a motion vector for the CP1 based on the top-right neighboring block. For example, if all the blocks of the neighboring block group 1 are non-available, the encoding device may derive the motion vector for the CP1 based on the motion vector of the CP0. Alternatively, if the left neighboring block of the neighboring block group 2 is available, the encoding device may derive a motion vector for the CP2 based on the left neighboring block. If the left neighboring block is not available and the left bottom neighboring block is available, the encoding device may derive a motion vector for the CP2 based on the left bottom neighboring block. For example, if all the block of the neighboring block group 2 are non-available, the encoding device may derive a motion vector for CP2 based on the motion vector of the CP0.

Alternatively, if the top neighboring block of the neighboring block group 1 is available and the affine motion model is applied to the top neighboring block, the encoding device may derive a motion vector for the CP1 based on the motion vector of the bottom-right sample of the top neighboring block. If the top neighboring block of the neighboring block group is available and the affine motion model is not applied to the top neighboring block, the encoding device may derive the motion vector for the CP1 based on the motion vector of the top neighboring block. If the top neighboring block of the neighboring block group 1 is not available and the top-right neighboring block of the neighboring block group 1 is available and the affine motion model is applied to the top-right neighboring block, the encoding device may derive a motion vector for the CP1 based on the motion vector of the bottom-left sample of the top-right neighboring block. If the top neighboring block of the neighboring block group 1 is not available and the top-right neighboring block of the neighboring block group 1 is available and the affine motion model is not applied to the top-right neighboring block, the encoding device may derive the motion vector for the CP1 based on the motion vector of the top-right neighboring block.

For example, if the left neighboring block of the neighboring block group 2 is available and the affine motion model is applied to the left neighboring block, the encoding device may derive a motion vector for the CP2 based on the motion vector of the bottom-right sample of the left neighboring block. If the left neighboring block of the neighboring block group 2 is available and the affine motion model is not applied to the left neighboring block, the encoding device may derive a motion vector for the CP2 based on the motion vector of the left neighboring block. If the left neighboring block of the neighboring block group 2 is not available and the bottom-left neighboring block of the neighboring block group 2 is available and the affine motion model is applied to the bottom-left neighboring block, the encoding device may derive a motion vector for the CP2 based on the motion vector of the top-right sample of the bottom-left neighboring block. If the left neighboring block of the neighboring block group 2 is not available and the bottom-left neighboring block of the neighboring block group 2 is available and the affine motion model is not applied to the bottom-left neighboring block, the encoding device may derive a motion vector for the CP2 based on the motion vector of the bottom-left neighboring block.

The encoding device derives a motion vector on a sample basis in the current block based on the motion vectors for the CPs (S820). In this connection, $(v_x, v_y)$ represents the sample-based motion vector for the (x, y) coordinate sample in the current block. According to the affine motion model, there may be different motion vectors for different sample coordinates in the current block. While knowing the motion vector of the CP0, the motion vector of the CP1, and the motion vector of the CP2, a motion vector according to the sample position in the current block may be derived. That is, according to the affine motion model, the sample-based motion vectors for the sample positions may be derived using the motion vectors at the CPs, that is, the motion vector $v0(v_{x0}, v_{y0})$ at the CP0, the motion vector $v1(v_{x1}, v_{y1})$ at the CP1, and $v2(v_{x2}, v_{y2})$ at the control point CP2, based on the ratio of the distances between the coordinate (x, y) of the target sample and the three control points CP0, CP1 and CP2. In this case, the encoding device may derive a sample-based motion vector of the sample position in the current block based on Equations 11 and 12 described above.

The encoding device generates a predicted sample of the current block based on the sample-based motion vector (S830). The encoding device may derive the reference region in the reference picture based on the sample-based motion vector. The encoding device may generate a predicted sample of the current block based on the reconstructed sample in the reference region. If the prediction mode for the current block is not skip mode, the encoding device may generate residual samples (or residual signals) based on the original samples and the predicted samples of the original picture. Alternatively, the encoding device may set the value of the affine motion flag to 1 if the affine motion model is applied to the current block.

The encoding device encodes the prediction mode information for the current block and outputs the encoded information (S840). The encoding device may encode information about the prediction mode for the current block and the derived motion vector and output the encoded information in the bitstream format. The encoding device may generate and encode and output the affine motion flag in the bitstream format. The bitstream may be transmitted to the decoding device over a network or using a storage medium.

Although not shown, the encoding device may encode and output information about residual samples for the current block. The information on the residual samples may include transform coefficients associated with the residual samples.

Figure 9:
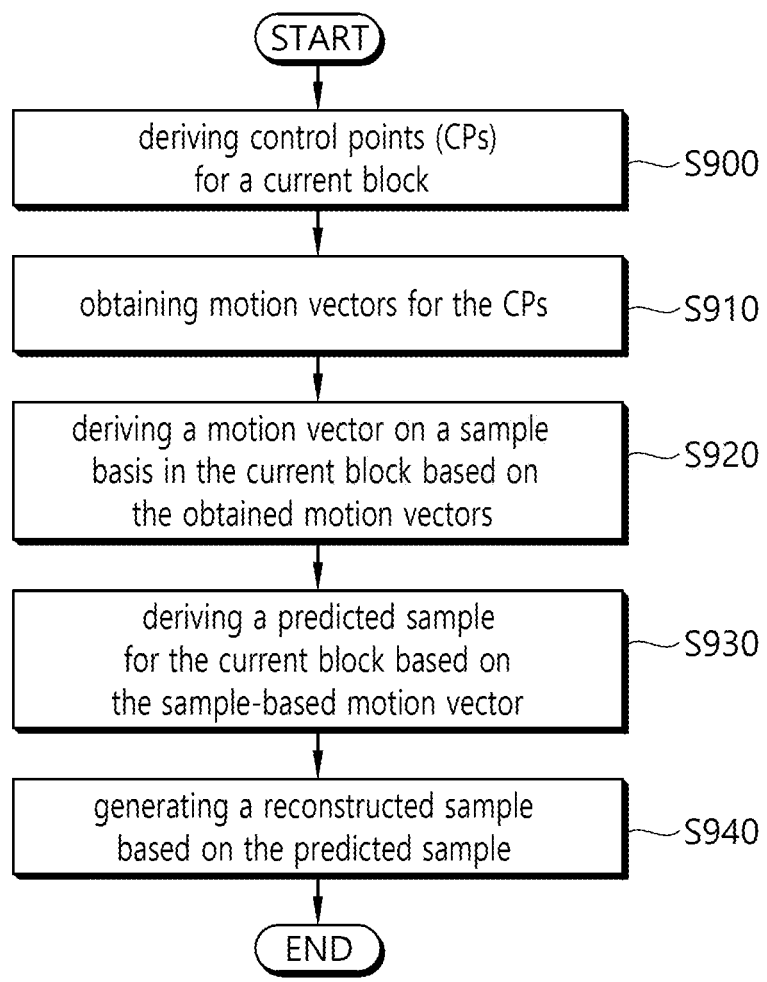
FIG. 9 shows a video decoding method by the decoding device according to the present invention.

FIG. 9 shows a video decoding method by the decoding device according to the present invention. The method disclosed in FIG. 9 may be carried out by the decoding device in FIG. 2. Specifically, for example, in FIG. 9, S900 to S930 may be performed by the prediction module of the decoding device. S940 may be performed by the adder of the decoding device.

The decoding device derives the control points (CPs) for the current block (S900). The decoding device may receive the affine motion flag from the bitstream. If the value of the affine motion flag is 1, the current block may be subjected to the affine motion model. If the affine motion model is applied to the current block, the decoding device may derive the CPs to apply the affine motion model. The CPs may be three.

For example, when the height and width of the current block are H and W, respectively, and the coordinate of the bottom-right sample position of the current block is set to (0, 0), the decoding device may derive three CPs: The coordinate of CP0 is (0, 0), the coordinate of CP1 is (0, −H), and the coordinate of CP2 is (−W, 0). That is, the decoding device may derive the CP0 as the sample having the sample position (0, 0), the CP1 as the sample having the sample position (0, −H) and the CP2 as the sample with the sample position (−W, 0). Alternatively, when each of the height and width of the current block is S, and the coordinate of the bottom-right sample position of the current block is set to (0, 0), the decoding device may derive three CPs: The coordinate of CP0 is (0, 0), the coordinate of CP1 is (0, −s), and the coordinate of CP2 is (−S, 0). That is, the decoding device may derive the CP0 as the sample with the sample position (0, 0), CP1 as the sample with sample position (0, −H) and CP2 as the sample with sample position (−W, 0).

The decoding device derives motion vectors for the CPs (S910).

The decoding device may derive the motion vector of the CPs based on the motion vector of the current block, and the motion vectors of the neighboring blocks to the current block.

For example, as for the motion vector of the CP0, the decoding device may generate a merge candidate list or a motion vector predictor candidate list based on the spatially and temporally neighboring blocks to the current block. The decoding device may derive the CP0 motion vector based on the merge candidate list or the motion vector predictor candidate list.

Specifically, the decoding device may derive a single motion vector from the merge candidate list as the motion vector of the CP0 based on the merge index obtained from the bitstream (in case of skip mode or merge mode). Alternatively, the decoding device derives a single motion vector from the motion vector predictor candidate list as a motion vector predictor for the CP0, based on the MVP flag obtained from the bitstream. The decoding device may derive the motion vector of the CP0 by adding the MVD obtained from the bitstream to the motion vector predictor (in case of AMVP mode). Information about the inter prediction mode may be obtained from the bitstream.

The motion vector of the CP1 and the motion vector of the CP2 may be derived based on neighboring blocks. The encoding device may derive, as the neighboring block group 1, the top-right neighboring block to the current block, and the top and rightmost neighboring block among the top neighboring blocks neighboring to the top boundary of the current block. The encoding device may derive, as the neighboring block group 2, the bottom-left neighboring block to the current block, and the bottom and left neighboring block among the left neighboring blocks adjacent to the left boundary of the current block. The motion vector of the CP1 may be derived based on the neighboring block group 1, while the motion vector of the CP2 may be derived based on the neighboring block group 2.

As for the motion vector of the CP1 and the motion vector of the CP2, which neighboring block for which a sample-based or block-based motion vector will be used as the motion vector of the CP1 and the motion vector of the CP2 may be determined based on availability the neighboring block groups and/or whether to apply the inter prediction mode thereto. In the following, a case where a block is not available may include the case where the corresponding block is not coded in inter prediction mode or the inter mode is not applied thereto. Specifically, if the top neighboring block of the neighboring block group 1 is available, the decoding device may derive the motion vector for the CP1 based on the top neighboring block. If the top neighboring block is not available and the top-right neighboring block is available, the decoding device may derive a motion vector for the CP1 based on the top-right neighboring block. For example, if all the blocks of the neighboring block group 1 are non-available, the decoding device may derive the motion vector for the CP1 based on the motion vector of the CP0. Alternatively, if the left neighboring block of the neighboring block group 2 is available, the decoding device may derive a motion vector for the CP2 based on the left neighboring block. If the left neighboring block is not available and the left bottom neighboring block is available, the decoding device may derive a motion vector for the CP2 based on the left bottom neighboring block. For example, if all the block of the neighboring block group 2 are non-available, the decoding device may derive a motion vector for CP2 based on the motion vector of the CP0.

Alternatively, if the top neighboring block of the neighboring block group 1 is available and the affine motion model is applied to the top neighboring block, the decoding device may derive a motion vector for the CP1 based on the motion vector of the bottom-right sample of the top neighboring block. If the top neighboring block of the neighboring block group is available and the affine motion model is not applied to the top neighboring block, the decoding device may derive the motion vector for the CP1 based on the motion vector of the top neighboring block. If the top neighboring block of the neighboring block group 1 is not available and the top-right neighboring block of the neighboring block group 1 is available and the affine motion model is applied to the top-right neighboring block, the decoding device may derive a motion vector for the CP1 based on the motion vector of the bottom-left sample of the top-right neighboring block. If the top neighboring block of the neighboring block group 1 is not available and the top-right neighboring block of the neighboring block group 1 is available and the affine motion model is not applied to the top-right neighboring block, the decoding device may derive the motion vector for the CP1 based on the motion vector of the top-right neighboring block.

For example, if the left neighboring block of the neighboring block group 2 is available and the affine motion model is applied to the left neighboring block, the decoding device may derive a motion vector for the CP2 based on the motion vector of the bottom-right sample of the left neighboring block. If the left neighboring block of the neighboring block group 2 is available and the affine motion model is not applied to the left neighboring block, the decoding device may derive a motion vector for the CP2 based on the motion vector of the left neighboring block. If the left neighboring block of the neighboring block group 2 is not available and the bottom-left neighboring block of the neighboring block group 2 is available and the affine motion model is applied to the bottom-left neighboring block, the decoding device may derive a motion vector for the CP2 based on the motion vector of the top-right sample of the bottom-left neighboring block. If the left neighboring block of the neighboring block group 2 is not available and the bottom-left neighboring block of the neighboring block group 2 is available and the affine motion model is not applied to the bottom-left neighboring block, the decoding device may derive a motion vector for the CP2 based on the motion vector of the bottom-left neighboring block.

The decoding device derives a sample-based motion vector in the current block based on the acquired motion vectors (S920). The decoding device may derive a sample-based motion vector according to the sample position in the current block, based on the motion vector of the CP0, the motion vector of the CP1, and the motion vector of the CP2. In this case, the decoding device may derive a sample-based motion vector of the sample position in the current block, based on Equation 11 and Equation 12 above.

The decoding device generates a predicted sample of the current block based on the sample-based motion vector (S930). The decoding device may derive the reference region in the reference picture based on the sample-based motion vector. The decoding device may generate a predicted sample of the current block based on the reconstructed sample in the reference region. The decoding device may generate the predicted sample for the current block based on the sample-based motion vector if the value of the affine motion flag is 1.

The decoding device generates reconstructed samples based on the predicted samples (S940). The decoding device may generate reconstructed samples based on the predicted samples if the prediction mode for the current block is not skip mode. The decoding device may receive residual signals from the encoding device and generate residual samples for the current block. In this case, the decoding device may generate the reconstructed samples based on the predicted sample and the residual samples. The decoding device may generate a reconstructed picture based on the reconstructed samples.

According to the present invention, more accurate sample-based motion vectors for the current block may be derived and thus the inter prediction efficiency may be significantly increased.

According to the present invention, motion vectors for samples in the current block may be efficiently derived based on the motion vectors of the control points for the current block.

According to the present invention, motion vectors for samples in the current block may be derived based on the motion vectors of available neighboring blocks, without additional information about the motion vectors of the control points for the current block. This can eliminate or reduce the amount of data for the motion vectors of the control points and thus improve overall coding efficiency.

According to the present invention, not only when the image in the current block is translated, but also when the image is rotated, zoomed in, zoomed out, or parallelogram-deformed, inter-prediction may be effectively performed using sample-based motion vectors. In this way, the amount of data for the residual signal for the current block can be eliminated or reduced, and, thus, the overall coding efficiency can be improved.

According to the present invention, motion vectors of control points may be derived based on already decoded neighboring blocks. This can significantly reduce the amount of information on the motion vectors of the control points and thus improve the overall coding efficiency.

In the above-described embodiments, methods are described on the basis of a flowchart using a series of steps or blocks, but the present invention is not limited to the sequence of steps. Some steps may occur simultaneously or in a different sequence than the steps described above. Further, those skilled in the art will understand that the steps shown in the sequence diagram are not exclusive, that other steps may be included, or that one or more steps in the flowchart may be deleted without affecting the scope of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, the method comprising:
    deriving control points (CPs) for a current block;
    obtaining motion vectors for the CPs;
    deriving a motion vector on a sample basis in the current block based on the obtained motion vectors;
    deriving a predicted sample for the current block based on the sample-based motion vector; and
    generating a reconstructed sample based on the predicted sample,
    wherein a coordinate of a bottom-right sample in the current block is (0, 0),
    wherein a coordinate of a CP0 among the CPs is (0, 0),
    wherein the number of CPs is three, wherein the CPs include CP0, CP1 and CP2,
    wherein, based on a height and width of the current block being H and W, respectively, a coordinate of the CP1 is (0, −H) and a coordinate of the CP2 is (−W, 0),
    wherein a motion vector for the CP1 is obtained based on a neighboring block group 1,
    wherein a motion vector for the CP2 is obtained based on a neighboring block group 2,
    wherein, based on a top neighboring block of the neighboring block group 1 being available, the motion vector for the CP1 is obtained based on the top neighboring block, and
    wherein, based on the top neighboring block of the neighboring block group 1 being unavailable and a top-right neighboring block of the neighboring block group 1 being available, the motion vector for the CP1 is obtained based on the top-right neighboring block.

2. The method of claim 1, wherein the sample-based motion vector is derived based on a following equation:

$$\begin{cases} v_x = \dfrac{v_{x_0} - v_{x_2}}{S}x + \dfrac{v_{x_0} - v_{x_1}}{S}y + v_{x_0} \\ v_y = \dfrac{v_{y_0} - v_{y_2}}{S}x + \dfrac{v_{y_0} - v_{y_1}}{S}y + v_{y_0} \end{cases}$$

wherein vx represents a x component of a motion vector of a (x, y) coordinate sample in the current block, and vy represents a y component of the motion vector of the (x, y) coordinate sample in the current block,
wherein vx0 and vy0 represent a x component and y component of a motion vector of the CP0 respectively, vx1 and vy1 represent a x component and y component of a motion vector of the CP1, respectively, and vx2 and vy2 represent a x component and y component of a motion vector of the CP2, respectively, and
wherein H is equal to S and W is equal to S.

3. The method of claim 1, wherein obtaining the motion vectors for the CPs comprises obtaining a motion vector for the CP0 based on a motion vector of a neighboring block to the current block.

4. The method of claim 3, further comprising receiving information about a motion vector difference (MVD) from bitstream,
    wherein the motion vector for the CP0 is derived based on the motion vector of the neighboring block and the MVD.

5. The method of claim 1, wherein the neighboring block group 1 includes a top-right neighboring block and a top neighboring block,
    wherein the neighboring block group 2 includes a bottom-left neighboring block and a left neighboring block,
    wherein the top neighboring block defines a rightmost block among top neighboring blocks neighboring a top boundary of the current block, and
    wherein the left neighboring block defines a lowest block among left neighboring blocks neighboring to a left boundary of the current block.

6. The method of claim 1, wherein obtaining the motion vectors for the CPs comprises:
    when the top neighboring block of the neighboring block group 1 is available and an affine motion mode is applied to the top neighboring block, deriving the motion vector for the CP1 based on a motion vector of a bottom-right sample of the top neighboring block;
    when the top neighboring block of the neighboring block group 1 is available and the affine motion mode is not applied to the top neighboring block, deriving the motion vector for the CP1 based on the motion vector of the top neighboring block.

7. The method of claim 1, wherein obtaining the motion vectors for the CPs comprises:
    when all of the blocks of the neighboring block group 1 are all non-available, deriving a motion vector for the CP1 based on a motion vector of the CP0.

8. The method of claim 5, wherein obtaining the motion vectors for the CPs comprises:
    when the left neighboring block of the neighboring block group 2 is available, deriving a motion vector for the CP2 based on the left neighboring block;

when the left neighboring block of the neighboring block group 2 is not available and the bottom-left neighboring block of the neighboring block group 2 is available, deriving a motion vector for the CP2 based on the bottom-left neighboring block.

9. The method of claim 8, wherein obtaining the motion vectors for the CPs comprises:
when the left neighboring block of the neighboring block group 2 is available and an affine motion mode is applied to the left neighboring block, deriving a motion vector for the CP2 based on a motion vector of a bottom-right sample of the left neighboring block;
when the left neighboring block of the neighboring block group 2 is available and the affine motion mode is not applied to the left neighboring block, deriving a motion vector for the CP2 based on a motion vector of the left neighboring block.

10. The method of claim 8, wherein obtaining the motion vectors for the CPs comprises:
when all of the blocks of the neighboring block group 2 are non-available, deriving a motion vector for CP2 based on a motion vector of the CP0.

11. The method of claim 1, further comprising receiving an affine motion flag via bitstream,
wherein when a value of the affine motion flag is 1, the predicted sample for the current block is derived based on the sample-based motion vector.

12. A video encoding method performed by an encoding device, the method comprising:
deriving control points (CPs) for a current block;
obtaining motion vectors for the CPs;
deriving a motion vector on a sample basis in the current block based on the obtained motion vectors;
generating a predicted sample for the current block based on the sample-based motion vector; and
encoding and outputting information about a prediction mode for the current block,
wherein a coordinate of a bottom-right sample in the current block is (0, 0),
wherein a coordinate of a CP0 among the CPs is (0, 0),
wherein the number of CPs is three, wherein the CPs include CP0, CP1 and CP2,
wherein, based on a height and width of the current block being H and W, respectively, a coordinate of the CP1 is (0, −H) and a coordinate of the CP2 is (−W, 0),
wherein a motion vector for the CP1 is obtained based on a neighboring block group 1,
wherein a motion vector for the CP2 is obtained based on a neighboring block group 2,
wherein, based on a top neighboring block of the neighboring block group 1 being available, the motion vector for the CP1 is obtained based on the top neighboring block, and
wherein, based on the top neighboring block of the neighboring block group 1 being unavailable and a top-right neighboring block of the neighboring block group 1 being available, the motion vector for the CP1 is obtained based on the top-right neighboring block.

* * * * *